(No Model.)

T. J. STOREY.
SPRING GEAR FOR VEHICLES.

No. 433,830.  Patented Aug. 5, 1890.

Witnesses

J. Edw. Maybee
F. R. Cameron

Inventor

Thos. J. Storey
by Donald C. Ridout & Co.
Attys

THE NORRIS PETERS CO., PHOTO-LITHO., WASHINGTON, D. C.

UNITED STATES PATENT OFFICE.

THOMAS J. STOREY, OF GANANOQUE, ONTARIO, CANADA.

SPRING-GEAR FOR VEHICLES.

SPECIFICATION forming part of Letters Patent No. 433,830, dated August 5, 1890.

Application filed December 5, 1889. Serial No. 332,715. (No model.)

*To all whom it may concern:*

Be it known that I, THOMAS J. STOREY, mechanic, of the town of Gananoque, in the county of Leeds, in the Province of Ontario, Canada, have invented a certain new and useful Improvement in a Side-Spring Running-Gear for Vehicles, of which the following is a specification.

The object of the invention is to construct a simply-made side-spring running-gear for vehicles, which shall have a large carrying capacity in proportion to its weight; and it consists, essentially, of a side-spring gear having the top and bottom plate of each spring set so as to extend obliquely from its respective spring and connect with the front and rear axle, so as to form diagonal braces, substantially as hereinafter more particularly explained.

Figure 1:
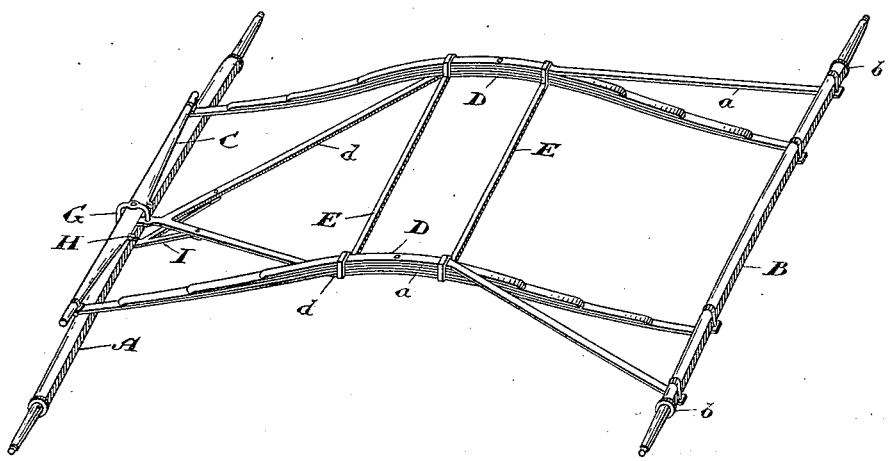
Figure 2:
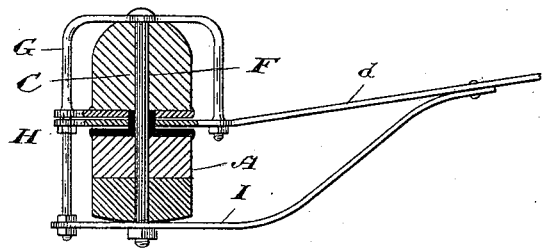

Figure 1 is a perspective view of my improved side-spring running-gear. Fig. 2 is an enlarged sectional view of the head-block front axle and their respective connections.

In the drawings, A represents a front axle, B the rear axle, and C the head-block, which may connect to the front axle A in any ordinary manner.

D represents the side springs connected in the usual manner to the rear axle B and to the head-block C.

E are body-loops arranged, as shown, to connect and brace together the two side springs D. It will be observed that the top plate $a$ of each spring D diverges outwardly from its spring, and is made sufficiently long to extend to the rear axle, with which it connects at a point near the axle-collar $b$. The bottom plate $d$ of each spring D diverges inwardly from its spring, and is made sufficiently long to extend to the center of the front axle, with which it is suitably connected either between the head-block C and the axle A or on the bottom of the said axle. I prefer to weld the two plates $d$ together and place the crotch thus formed between the head-block C and the axle A, as the connection thus formed will neither loosen nor rattle. It will of course be understood that a hole for the king-bolt F is made in the crotch connecting the two plates $d$ together, and when the said crotch is placed between the head-block and the axle, this hole in the crotch is made sufficiently large to receive the collar formed on the bottom plate of the circle or fifth-wheel H. Consequently the insertion of the crotch between the head-block and the front axle will not interfere with the satisfactory working of the fifth-wheel H.

G is the king-bolt brace. The front leg of this brace G passes through a hole in the projecting portion of the circle or fifth-wheel H and through a hole in the crotch-extension, also through a hole in the safety-brace I, a nut being placed on the end of this leg to secure the brace I to it. The brace I is also secured to the king-bolt F, from which point it branches outwardly and upwardly and extends to the bottom plate $d$ just behind the crotch formed by the connection between said leaves, at which point the brace is secured to the said plate $d$. The back leg of the king-bolt brace G passes through and is secured to the crotch formed by the joint between the two plates $d$. I prefer that the bottom plate $d$ should extend the full length of its spring; but it will of course be understood that the said plates may terminate just behind the center of their respective springs.

What I claim as my invention is—

1. A side-spring running-gear having the bottom plate of each spring set so as to converge toward the center of the front axle to which it is suitably connected, and the top plate of each spring set so as to diverge toward the end of the rear axle, to which it is suitably connected.

2. A side-spring running-gear having the bottom plate of each spring set so as to converge toward the center of the front axle, and passing between the said axle and its head-block is securely connected by the king-bolt F, brace G, and safety-brace I, substantially as specified.

Gananoque, November 22, 1889.

THOS. J. STOREY.

In presence of—
H. E. WALTON,
M. D. NICHOLSON.